(12) United States Patent
Al-Taweel et al.

(10) Patent No.: US 10,799,319 B1
(45) Date of Patent: Oct. 13, 2020

(54) TOOTH TAPERING CONTROL GUIDE

(71) Applicant: KING SAUD UNIVERSITY, Riyadh (SA)

(72) Inventors: Sara Mohammed Al-Taweel, Riyadh (SA); Safa Mohammed Alrashed, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/663,997

(22) Filed: Oct. 25, 2019

(51) Int. Cl.
*A61C 1/08* (2006.01)
*A61C 19/055* (2006.01)
*A61C 3/02* (2006.01)

(52) U.S. Cl.
CPC .............. *A61C 1/082* (2013.01); *A61C 3/02* (2013.01); *A61C 19/055* (2013.01)

(58) Field of Classification Search
CPC ......... A61C 1/082; A61C 1/084; A61C 1/085; A61C 5/44; A61C 19/055; A61C 14/041–043
USPC .......................................................... 433/75
See application file for complete search history.

(56) References Cited

U.S. PATENT DOCUMENTS

| | | | | |
|---|---|---|---|---|
| 2,621,408 A | * | 12/1952 | Klein | ..................... A61C 1/082 433/76 |
| 3,063,149 A | | 11/1962 | Suga | |
| 3,078,580 A | | 2/1963 | Galvez | |
| 3,254,413 A | | 6/1966 | Suga | |
| 4,144,645 A | | 3/1979 | Marshall | |
| 4,334,755 A | | 8/1982 | Gold et al. | |
| 5,055,042 A | * | 10/1991 | Jansen | ................... A61C 1/082 433/76 |
| 5,989,024 A | * | 11/1999 | Jonjic | .................. A61C 19/055 433/76 |
| 6,511,323 B1 | | 1/2003 | Wilkinson | |
| 8,651,860 B2 | | 2/2014 | Kwon | |
| 2004/0219482 A1 | * | 11/2004 | Bina | ........................ A61C 5/44 433/75 |
| 2006/0240384 A1 | * | 10/2006 | Fraccon | .............. A61C 8/0012 433/173 |
| 2007/0298373 A1 | * | 12/2007 | Lette | ...................... A61C 1/084 433/72 |
| 2013/0209953 A1 | * | 8/2013 | Arlinsky | ................ A61C 8/009 433/27 |
| 2018/0042696 A1 | | 2/2018 | Samrano | |

* cited by examiner

*Primary Examiner* — Edward Moran
(74) *Attorney, Agent, or Firm* — Nath, Goldberg & Meyer; Richard C. Litman

(57) ABSTRACT

A tooth tapering control guide can be used to create an accurate and consistent taper angle for a target tooth. The guide includes a telescoping member which may be secured to a tooth that is adjacent to the target tooth. The telescoping member includes an upper rod and a lower rod that are telescopically connected. The upper rod of the telescoping member is generally L-shaped, including a vertical portion and a horizontal portion that extends normal to the vertical portion. The horizontal portion includes a rectangular slot along its lower surface and a clasp rod that is slidable within the slot. The vertical portion telescopically receives the lower rod. The clasp rod includes a clasp at a lower end that is attachable to a drill. Once the drill clasp is secured to the drill, the drill bit can be maintained at a constant angle (e.g., 90 degrees) with respect to the target tooth.

5 Claims, 4 Drawing Sheets

US 10,799,319 B1

TOOTH TAPERING CONTROL GUIDE

BACKGROUND

1. Field

The disclosure of the present patent application relates to preparing teeth, and particularly to a guide for controlling the movement of a drill.

2. Description of the Related Art

Tooth preparation includes mechanical alteration of the outer tooth surface and/or removal of a portion of the tooth structure to place the tooth in condition to receive a full crown or fixed partial denture restoration.

Preparing the tooth is performed with the use of a hand-held drill having a burred drill bit. The drill bit is used to cut into the outer surface of the tooth. When cutting into the tooth, maintaining an appropriate taper angle (the angle of each of opposing tooth walls) of 6 degrees is an important factor for the long term success of the dental prosthesis. The 6 degree taper angle provides greater surface area to maximize prosthesis retention, prevents the presence of undercut, and permits complete seating of the prosthesis during cementation. When controlling a drill with only the user's hand, it is very difficult to maintain the drill bit in a position perpendicular to the tooth. In many cases, operator error will destroy the taper and unnecessarily remove tooth structure. Accordingly, the operator error may result in a weakened tooth structure, decreased prosthesis retention, or an unfitted prosthesis that will require a second procedure that wastes dental material and time while increasing cost.

Thus, a tooth tapering control guide solving the aforementioned problems is desired.

SUMMARY

A tooth tapering control guide can be used to create an accurate and consistent taper angle for a target tooth. The guide includes a telescoping member which may be secured to a tooth that is adjacent to the target tooth or to the target tooth itself. The telescoping member includes an upper rod and a lower rod that are telescopically connected. The upper rod of the telescoping member is generally L-shaped, including a vertical portion and a horizontal portion that extends normal to the vertical portion. The horizontal portion includes a rectangular slot along its lower surface and a clasp rod that is slidable within the slot. The vertical portion telescopically receives the lower rod. The clasp rod includes a clasp at a lower end that is attachable to a drill. Once the drill clasp is secured to the drill, the drill bit can be maintained at a constant angle (e.g., 90 degrees) with respect to the target tooth.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present subject matter is directed to a tooth tapering control guide for creating an accurate and consistent taper angle for a tooth that is to be treated (hereinafter, "target tooth"). The guide includes a telescoping member which may be secured to a tooth that is adjacent to the target tooth or to the target tooth itself. The telescoping member includes an upper rod and a lower rod that are telescopically connected. The upper rod of the telescoping member is generally L-shaped, including a vertical portion and a horizontal portion that extends normal to the vertical portion. The horizontal portion includes a rectangular slot along its lower surface and a clasp rod that is slidable within the slot. The vertical portion telescopically receives the lower rod. The clasp rod includes a clasp at a lower end that is attachable to a drill. Once the drill clasp is secured to the drill, the drill bit can be maintained at a constant angle (e.g., 90 degrees) with respect to the target tooth.

Figure 1:
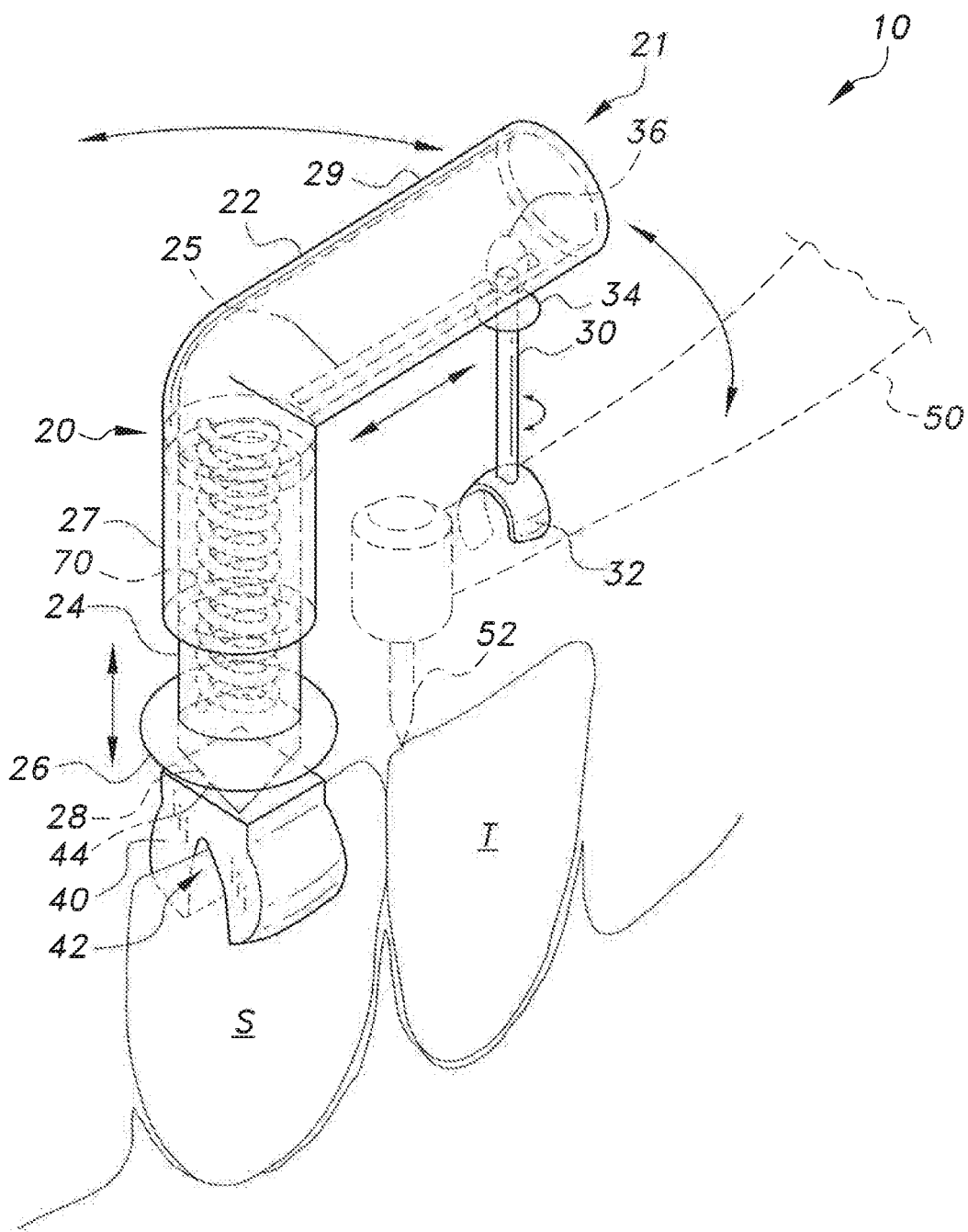
FIG. 1 is a perspective, environmental view of the tooth tapering control guide attached to an incisal edge of a tooth.
Figure 2:
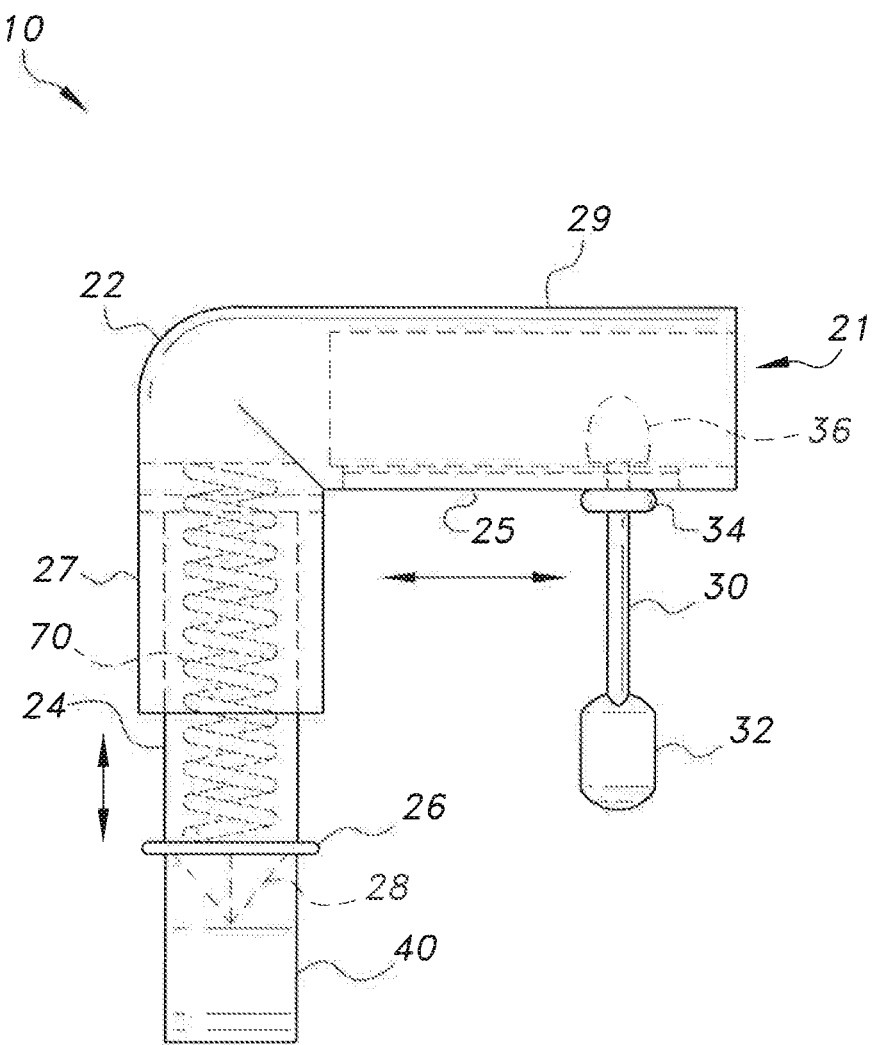
FIG. 2 is a perspective side view of the tooth tapering control guide.

As shown in FIGS. 1-4, the telescoping member 20 includes a lower rod 24 and a generally L-shaped upper rod 22 that are telescopically connected, as shown in FIG. 2. A bottom end of the lower rod 24 can include a circular flange 26 and a pyramidal tip 28. The upper rod 22 may include a vertical portion 27 and a horizontal portion 29 that are pivotally connected together. The horizontal portion 29 can be perpendicular to the vertical portion 27. The vertical portion 27 of the upper rod 22 telescopingly receives the lower rod 24. The lower rod 22 is confined to the vertical portion 27. The telescopic connection can permit axial movement and rotational movement between the rods 22, 24. A lower end of the upper rod 22 and/or an upper end of the lower rod 24 may include one or more stoppers to prevent the rods 22, 24 from being pulled apart. In some embodiments, the telescopic member 20 may include a spring 70 biasing the upper member 22 away from the lower member 24.

The lower rod 24 of the telescoping member 20 may have a tooth clip 40 selectively attachable to a lower end thereof for attaching to a support tooth S or the target tooth T. As shown in FIG. 1, the tooth clip 40 has a cavity 44 defined in an upper surface of the clip for receiving the pyramidal tip 28. A slot or groove 42 in a lower surface of the clip 40 is configured for receiving an incisal edge of a lower support tooth S or the target tooth T. The tooth clip 40 and telescoping member 20 can be connected together by inserting the lower pyramidal tip 28 of the telescoping member 20 into the pyramidal shaped cavity 44 of the clip 40. In some non-limiting embodiments, the pyramidal tip 28 may engage the walls of the cavity 44 in a friction fit. When the pyramidal tip 28 is fully seated in the pyramidal cavity of the clip 40, the flange 26 may rest on an upper surface of the clip 40 to further stabilize the lower rod 24 with respect to the clip 40. Although a pyramidal shape is shown, the cavity 44 of the tooth clip 40 and the tip 28 of the lower rod 22 may have a tetrahedral or a prism shape, or any other shape that will prevent rotation when the tooth clip 40 and lower rod 24 are mated.

Figure 3:
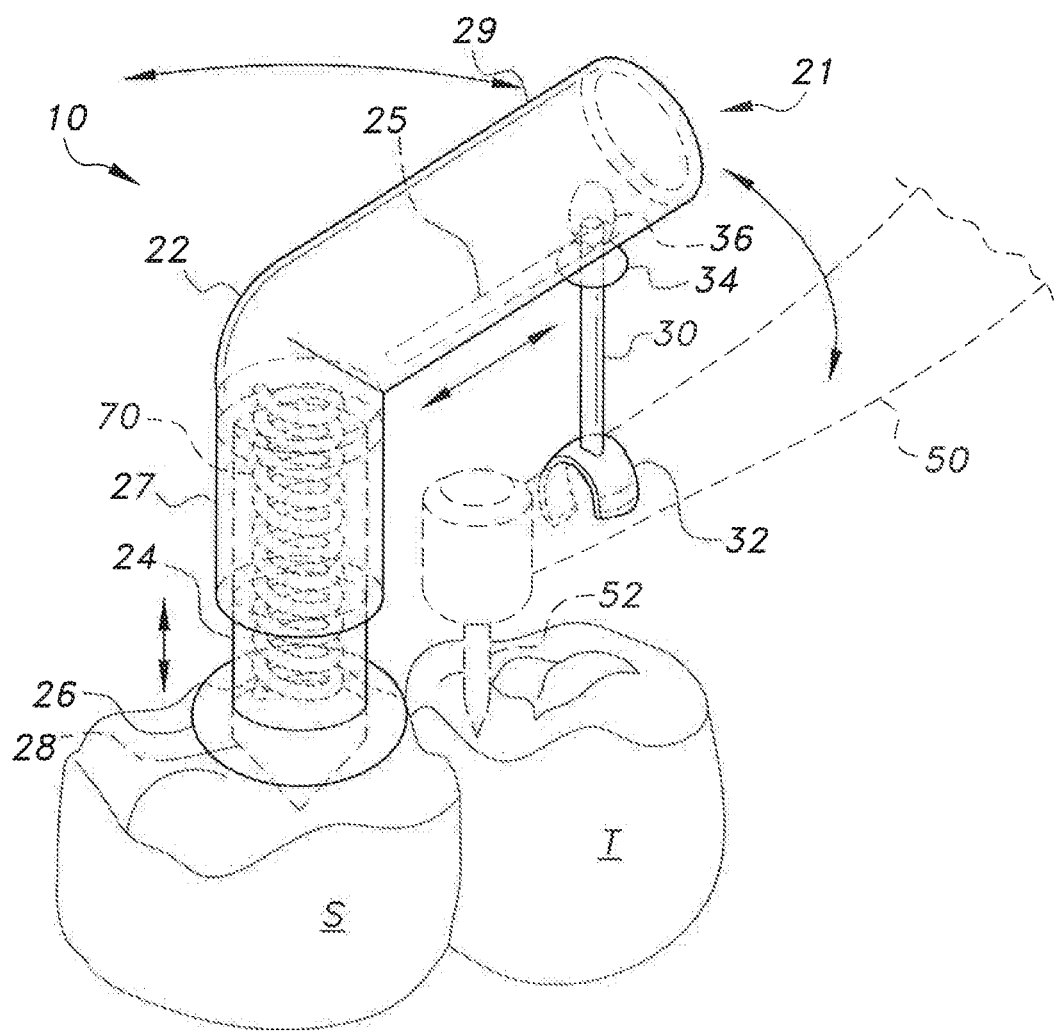
FIG. 3 is a perspective view of the tooth tapering control guide attached to an occlusive surface of a tooth.

The horizontal portion 29 includes a generally rectangular slot 25 defined within a lower surface thereof for slidably receiving an upper end 36 of a clasp rod 30. The upper end 36 may be round or spherical. The slot 25 may extend lengthwise along the horizontal portion 29. The clasp rod 30 can slide freely within the slot 25 and rotate axially. A flange 34 extends from the clasp rod 30 immediately below the slot 25 to prevent the clasp rod 30 from moving upwards or tilting. A drill clasp 32 may be connected to a lower end of the clasp rod 30. The drill clasp 32 may be designed to connect to a neck of a drill 50 and hold the drill 50 at a set orientation. In some embodiments, the drill clasp 32 may be a generally C-shaped clip with flexible arms, as shown in FIGS. 1-3. The arms of the clasp 32 can be configured to latch onto the drill 50, as shown. An inner surface of the clasp 32 may have a high friction material to further secure the clasp 32 on the drill 50.

FIG. 3 shows a second configuration of the guide 10 for attachment to an occlusal surface of a tooth S, as opposed to the incisal edge connection shown in FIG. 1. Unlike incisors and canines which have an incisal edge, molars and premolars have an occlusal surface. The tooth clip 40 is not used when attaching the drill guide 10 to an occlusal surface. Instead, a cavity or pit can be formed in the supporting tooth S or the target tooth T for supporting the pyramidal tip 28 of the lower rod 24. The cavity in the tooth S can be pyramidal and, similar to the pyramidal cavity in the tooth clip 40, can be useful for maintaining the drill guide 10 in an upright position. The flange 26 immediately above the pyramidal tip 26 of the lower rod 24 stabilizes the guide 10 by resting on the occlusal surface of the tooth S or T.

Figure 4:
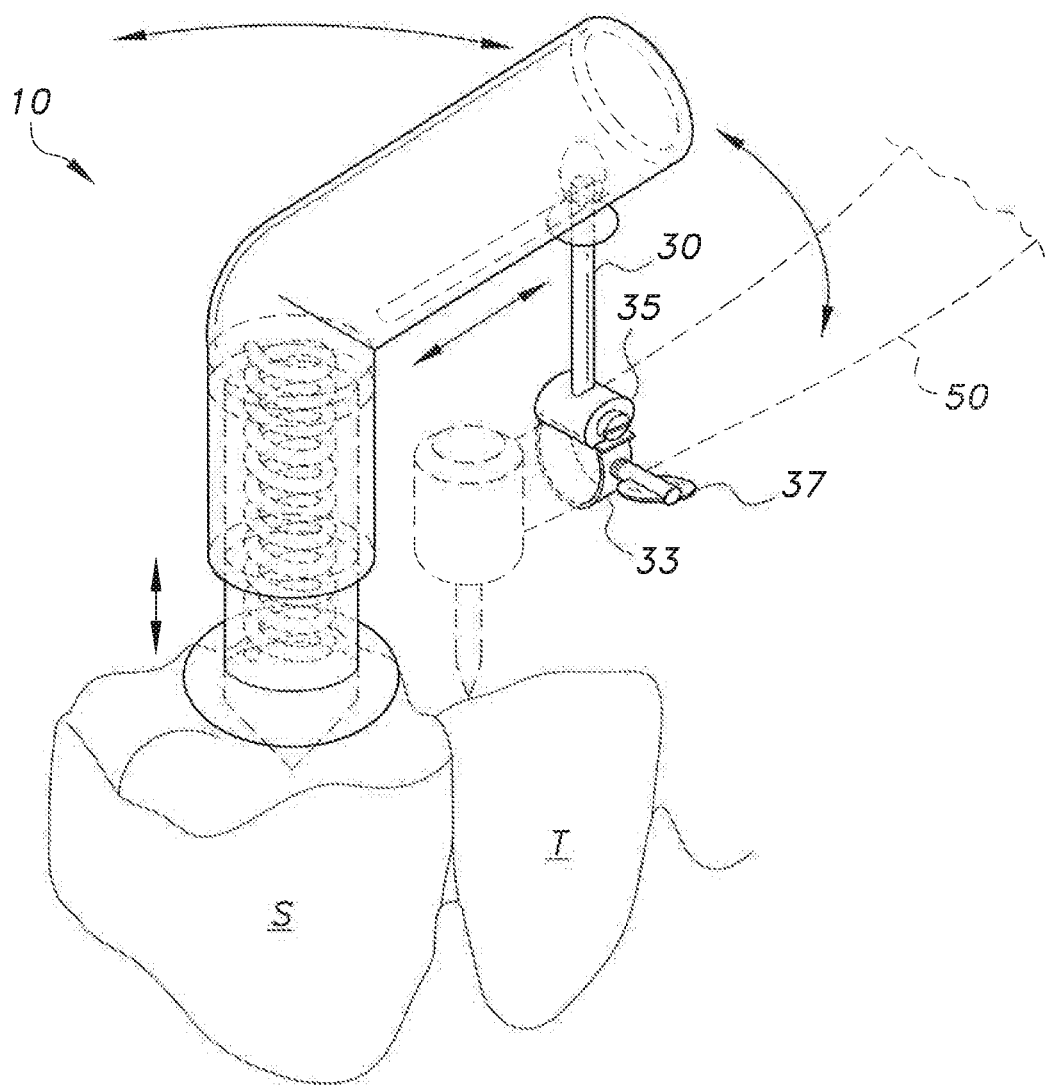
FIG. 4 is a perspective view of the tooth tapering control guide having a second embodiment of a clasp attached to an occlusive surface of a tooth.

FIG. 4 shows the drill guide 10 with a clasp 33 that is configured as an adjustable, generally circular loop, as opposed to the C-shaped clasp 32 shown in FIGS. 1-3. A size of the clasp 33 may be adjustable to facilitate connecting and detaching the clasp 33 from the drill. For example, the clasp 33 can include a rotatable adjustment screw 35 that controls a size of the clasp 33. The clasp 33 may include a threaded aperture for receiving a threaded bolt 37 therethrough. Tightening of the bolt 37 allows the bolt 37 to contact the drill 50 and, thereby, secures the clasp 33 to the drill 50. An inner surface of the loop 33 may have a high friction coating to further prevent rotation of the drill 50 with respect to the clasp 33.

In use, a practitioner can begin preparing a tooth by securing the drill guide 10 to the support tooth S or the target tooth T. In the cases shown in FIGS. 3-4, tooth S or tooth T has an occlusal surface, not an incisal edge. For this type of tooth a pyramidal pit can be formed in the support tooth S or the target tooth T. The pyramidal tip 28 of the lower rod 24 can then be inserted directly into the pit formed in the support tooth S or the target tooth T. In the cases shown in FIGS. 1-2, the clip 40 can first be attached to the support tooth S and then the pyramidal tip 28 of the lower rod 24 can be inserted into the clip 40. The lower rod 24 of the telescoping member may be aligned so it is parallel to a longitudinal axis of the target tooth T. Once the practitioner is satisfied with the alignment of the guide 10, the drill 60 may be attached. The bolt 37 may be used to secure the drill bit. Once the drill 50 is secured to the guide 10, the drill bit 52 should be perpendicular to the target tooth T. While preparing the tooth, the practitioner can move the drill 50 up or down due to the telescopic nature of the telescopic member 20 and horizontally due to the slidable connection of the clasp rod with the upper rod 22. The clasp maintains the drill bit 52 perpendicular to the target tooth T even when the drill is moved in these directions. The set angular orientation of the drill bit 52 can prevent errors with regard to the taper angle of the target tooth T. Once the taper is formed, the target tooth T may receive a full crown or fixed partial denture restoration.

It is to be understood that the tooth tapering control guide is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A tooth tapering control guide comprising:
a telescoping member including a lower rod, a generally L-shaped upper rod, and a clasp rod, the L-shaped upper rod including a vertical portion and a horizontal portion, the vertical portion telescopically connected to the lower rod, wherein the vertical portion includes a spring for biasing the L-shaped upper rod away from the lower rod, the lower rod being confined to the vertical portion, further wherein the horizontal portion includes a slot and an upper end of the clasp rod extends within the slot thereby slidably engaging the horizontal portion, the clasp rod being perpendicular to the horizontal portion;
a drill clasp connected to a lower end of the clasp rod, the drill clasp being configured for attachment to a drill; and
a tooth clip, a lower surface of the tooth clip defining a tooth receiving slot for receiving an incisor edge of a tooth, and an upper surface of the tooth clip defining a cavity for receiving a lower end of the lower rod, wherein the lower end of the lower rod includes a pyramidal tip and the cavity defined within the tooth clip is pyramidal.

2. The tooth tapering control guide of claim 1, wherein a surface of the tooth receiving slot includes a material or coating to increase friction.

3. The tooth tapering control guide of claim 1, wherein the lower rod further includes a flange at the lower end thereof.

4. The tooth tapering control guide of claim 1, wherein the upper end of the clasp rod further includes a flange, the flange being configured to extend across a portion of the slot and engage a wall of the horizontal portion.

5. The tooth tapering control guide of claim 1, wherein the drill clasp comprises an adjustable loop, an aperture extending through a wall of the loop, and a threaded screw engaging the aperture.

\* \* \* \* \*